US007043034B2

(12) United States Patent
Poling et al.

(10) Patent No.: US 7,043,034 B2

(45) Date of Patent: May 9, 2006

(54) LOUDSPEAKER WITH SINGLE OR DUAL CHANNEL INPUT SELECTOR AND LOCKOUT

(75) Inventors: John B. Poling, Sparks, MD (US); Bradley M. Starobin, Baltimore, MD (US); Allen S. Baran, Baltimore, MD (US); Danny A. Wakefield, Niles, OH (US)

(73) Assignee: Britannia Investment Corporation, San Diego, CA (US)

( * ) Notice: Subject to any disclaimer, the term of this patent is extended or adjusted under 35 U.S.C. 154(b) by 0 days.

(21) Appl. No.: 10/660,733

(22) Filed: Sep. 12, 2003

(65) Prior Publication Data

US 2005/0058309 A1 Mar. 17, 2005

(51) Int. Cl.
*H02B 1/00* (2006.01)

(52) U.S. Cl. ........................ 381/123; 381/11; 381/332; 381/394; 381/395; 200/252

(58) Field of Classification Search ................ 381/123, 381/81, 85, 11, 386, 394, 395, 189, 332, 77, 381/124; 200/547; 439/577

See application file for complete search history.

(56) References Cited

U.S. PATENT DOCUMENTS

| | | | | |
|---|---|---|---|---|
| 4,181,819 | A * | 1/1980 | Cammack | 381/300 |
| 4,330,691 | A * | 5/1982 | Gordon | 381/335 |
| 5,757,933 | A * | 5/1998 | Preves et al. | 381/313 |
| 6,192,860 | B1 * | 2/2001 | Hatlen | 123/352 |
| 6,281,457 | B1 * | 8/2001 | Chang | 200/547 |
| 6,690,806 | B1 * | 2/2004 | Darbut et al. | 381/313 |
| 6,876,749 | B1 * | 4/2005 | Killion et al. | 381/122 |
| 2001/0036287 | A1 * | 11/2001 | Beard et al. | 381/313 |
| 2002/0001391 | A1 * | 1/2002 | Darbut | 381/122 |
| 2002/0012435 | A1 * | 1/2002 | Colegrave et al. | 381/74 |
| 2003/0174855 | A1 * | 9/2003 | Hawkins et al. | 381/386 |
| 2003/0179894 | A1 * | 9/2003 | Saltykov | 381/313 |
| 2004/0266275 | A1 * | 12/2004 | Billow et al. | 439/838 |

* cited by examiner

*Primary Examiner*—Huyen Le
*Assistant Examiner*—Corey Chau
(74) *Attorney, Agent, or Firm*—Sterne, Kessler, Goldstein & Fox P.L.L.C.

(57) ABSTRACT

A dual purpose loudspeaker incorporating at least two audio signal inputs and at least one switch is adapted to receive and reproduce either a single audio signal input or two audio signal inputs according to the position of the switch. A switch slide mechanically linked to the switch is provided which blocks one of the audio signal inputs when the switch is in the single-channel position, thereby preventing erroneous connection to the blocked audio signal input.

5 Claims, 11 Drawing Sheets

LOUDSPEAKER WITH SINGLE OR DUAL CHANNEL INPUT SELECTOR AND LOCKOUT

BACKGROUND OF THE INVENTION

1. Field of the Invention

The present invention relates generally to the field of loudspeaker design and specifically to the design of multi-purpose loudspeakers intended to accept single or dual channel audio signal inputs.

2. Background of the Invention

It has become common practice in the design and installation of distributed audio systems to utilize a single loudspeaker to reproduce both channels of a stereo audio system where the location or cost considerations make the use of a stereo pair of loudspeakers undesirable. Such situations may include, by way of example, outdoors where the need to cover a large area with sound makes the use of stereo pairs of loudspeakers both undesirable and impractical, or extension speakers in smaller rooms where more than one speaker would be impractical. It has also become common practice to design such special application loudspeakers in such a way as to accept either a single channel input, for use in stereo pairs, or a dual channel input, for use individually to reproduce both stereo channels. This dual purpose feature increases the applications flexibility of the loudspeaker and reduces the number of different versions of the product that must be manufactured and kept in inventory.

As is well known to those skilled in the art, the single or dual channel capability may be achieved in several different ways. For example, as shown in FIG. 1, such a loudspeaker may include two transducers with two separate inputs and a switch for determining whether the loudspeaker is operating in single or dual channel mode. Another method as shown in FIG. 2, utilizes a single transducer with two separate voice-coil windings, two separate inputs respectively connected to the two voice-coil windings and a switch for determining single or dual channel operational mode. Yet another method, as shown in FIG. 3, combines a dual voice-coil mid-range or low frequency transducer with two separate high frequency transducers. In this case, two separate inputs are connected to separate crossover networks connected respectively to one voice-coil winding and one high frequency transducer, and to the other voice-coil winding and other high frequency transducer. A switch is also employed to determine dual or single channel operating mode. Although not required, the switch is used to determine the operating mode as the switch eliminates the need for additional external wiring when using such a loudspeaker in single channel mode.

Such dual purpose loudspeakers are typically installed as part of a distributed audio entertainment system either by a professional installer or by the end user of the product. Upon installation, the installer is required to choose the correct operating mode and to make the proper connections to the inputs for that operating mode. Typically, nothing prevents the installer from incorrectly setting the operating mode switch or from making the wrong input connections for the chosen operating mode. As is also well known to those skilled in the art, if the input connections do not match the operating mode selected by the switch, the loudspeaker will not perform correctly. Depending on the specific configuration of the loudspeaker circuitry, damage to the amplifier or loudspeaker may also occur as a result of improper installation.

Accordingly, needed in the art is a way to prevent improper connections to the inputs of a single-dual channel loudspeaker. Also needed in the art is a way to indicate that the proper operating mode has been chosen and that the proper connections have been made.

SUMMARY OF THE INVENTION

Accordingly, provided herein is a loudspeaker system including first and second audio signal input connections, a switch with first and second switch positions, and a switch slide mechanically coupled to the switch. The first switch position configures the loudspeaker system to reproduce sound only from the first audio signal input connection, and the second switch position configures said loudspeaker system to reproduce sound from both the first and second audio signal input connections. Further, when said switch is in said first switch position, the switch slide is positioned so as to prevent the connection of an input signal to the second audio signal input connection, and when the switch is in the second switch position, the switch slide is positioned so as to permit connection of input signals to both first and second audio signal input connections.

BRIEF DESCRIPTION OF THE DRAWINGS/FIGURES

Features, aspects and advantages of the present invention will become better understood with reference to the following description, appended claims, and accompanying drawings wherein:

Figure 4:
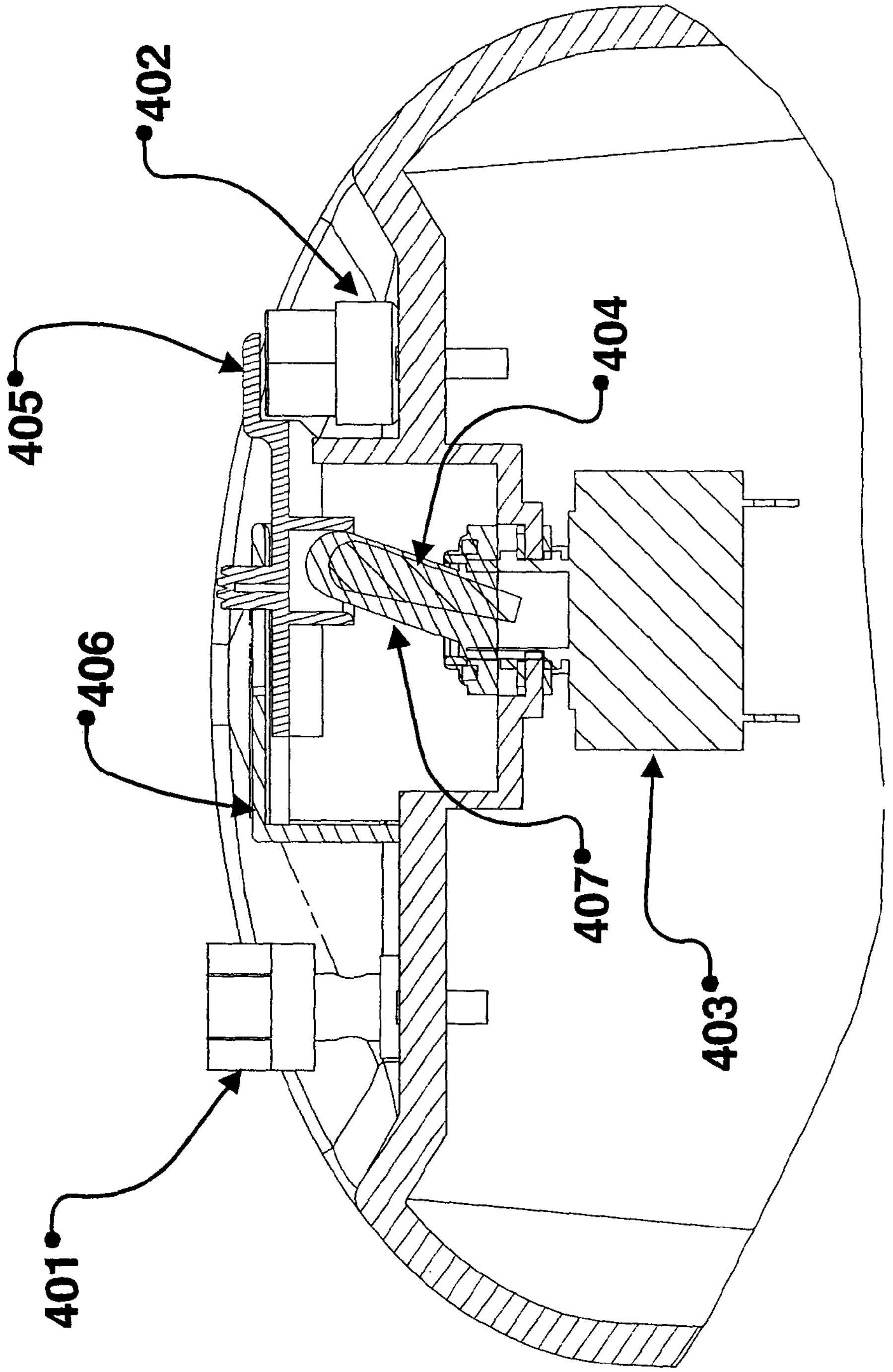
FIG. 4 illustrates a partial, cut-away side view of a dual purpose loudspeaker according to a first embodiment of the present invention.
Figure 4A:
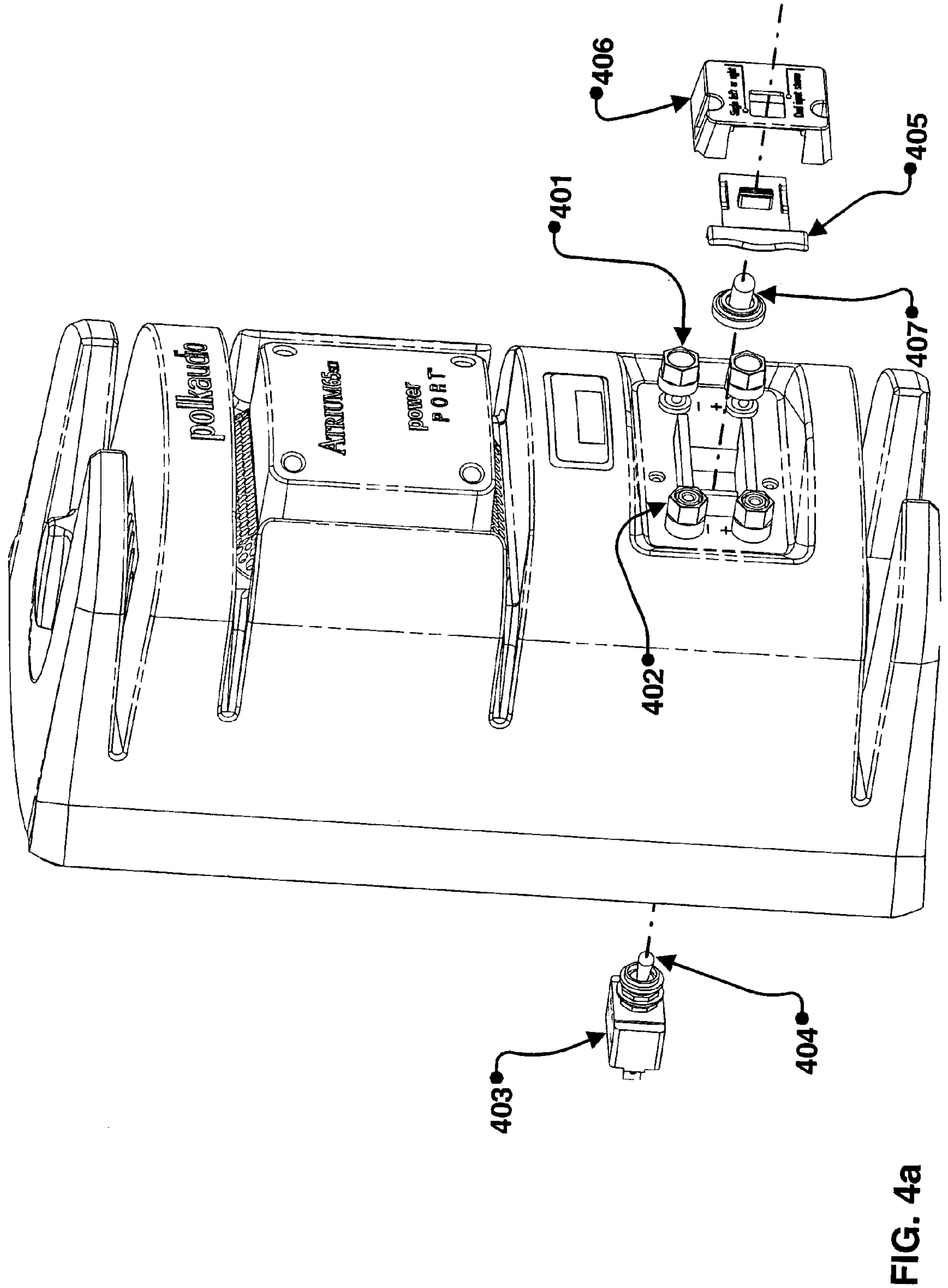

FIG. 4*a* illustrates a perspective, partially exploded view of the exterior of the dual purpose loudspeaker according to the first embodiment of the present invention.

Figure 4B:
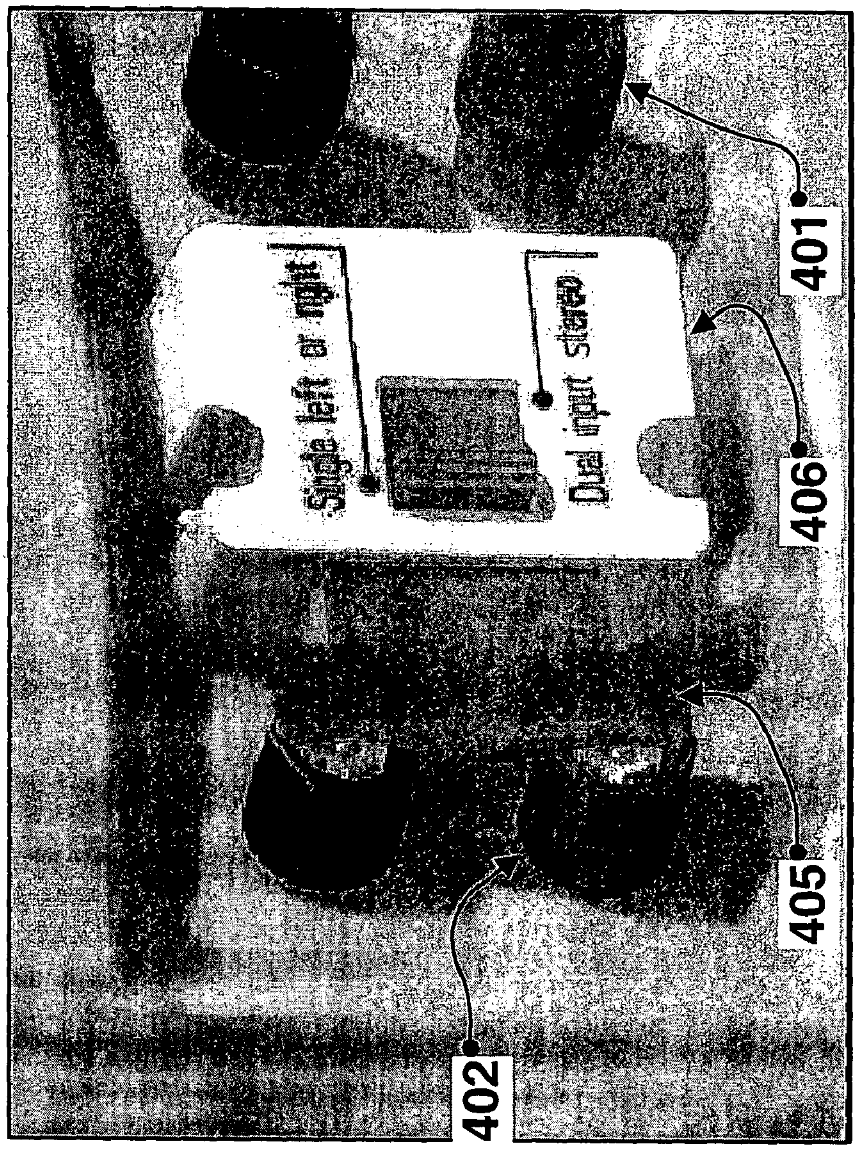

FIG. 4*b* shows a perspective view of a slide switch of the dual purpose loudspeaker according to the first embodiment of the present invention.

Figure 4C:
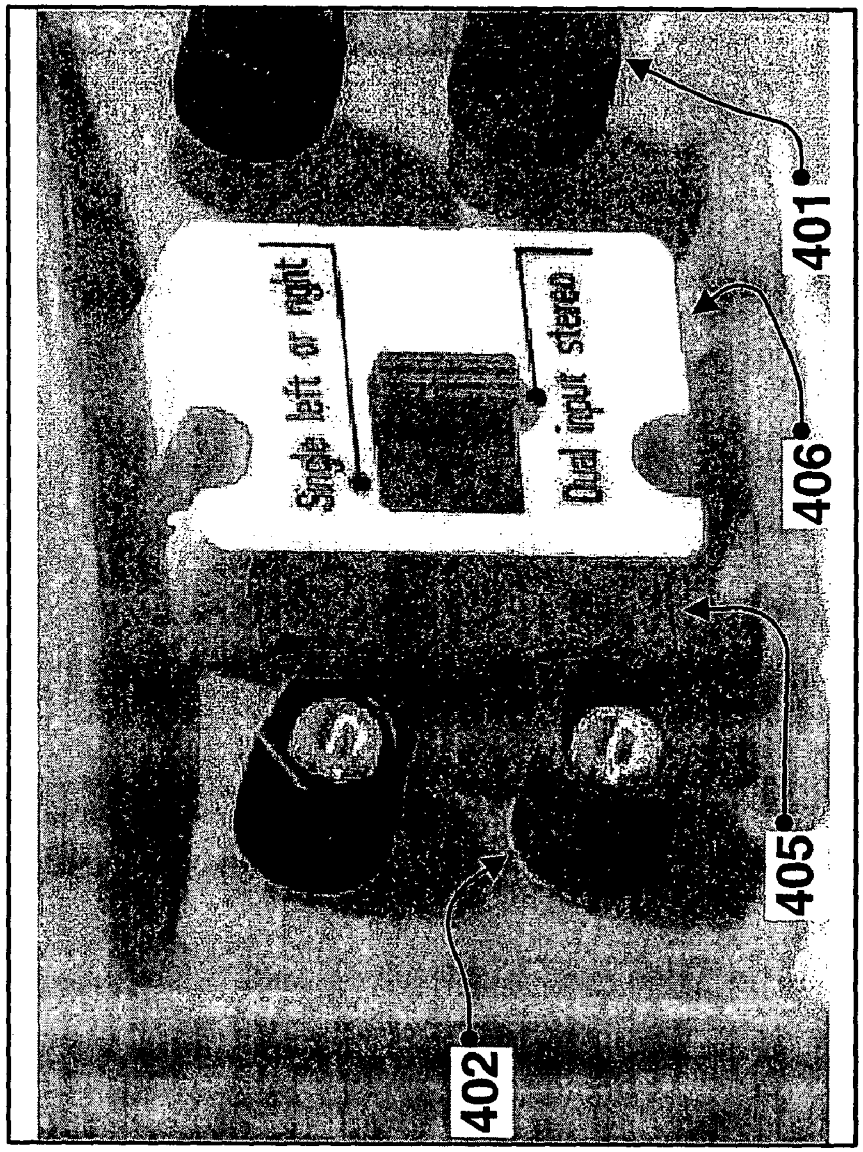

FIG. 4*c* shows a perspective view of a slide switch of the dual purpose loudspeaker according to the first embodiment of the present invention.

Figure 4D:
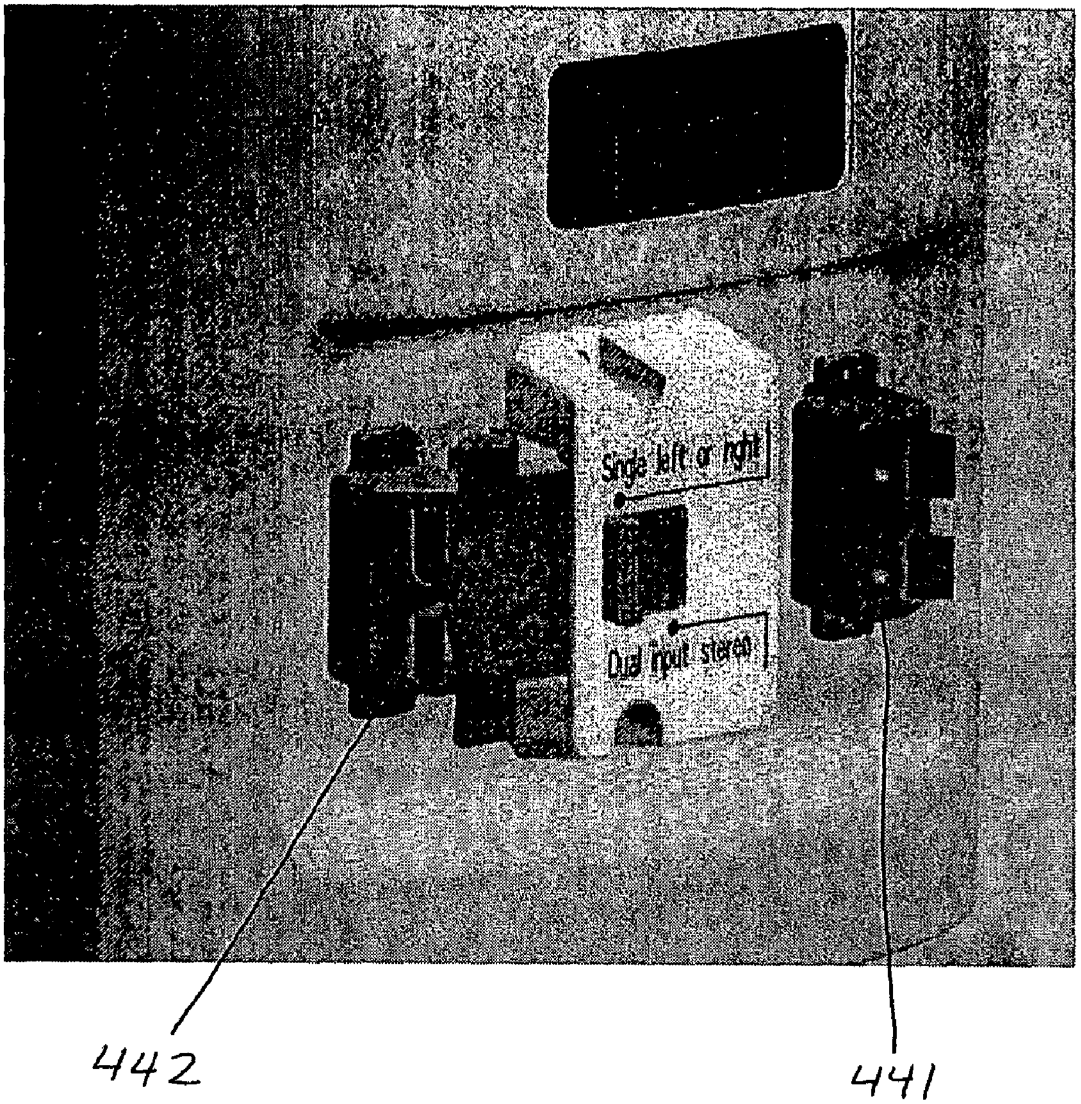

FIG. 4*d* illustrates a second embodiment of the present invention using spring-clip-type connections.

Figure 5:
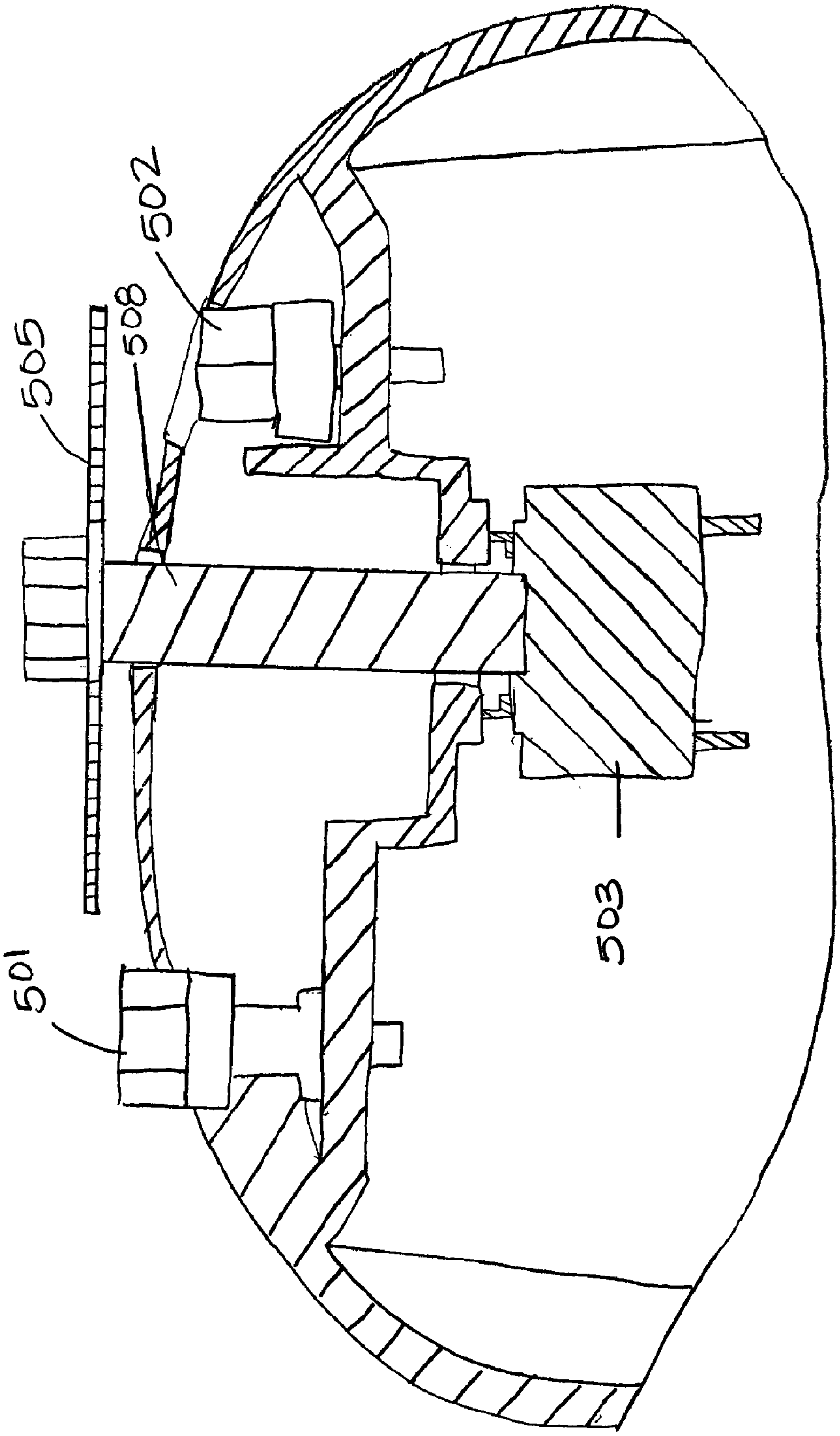

FIG. 5 illustrates a partial, cut-away side view of a dual purpose loudspeaker according to a third embodiment of the present invention incorporating a rotary switch.

Figure 5A:
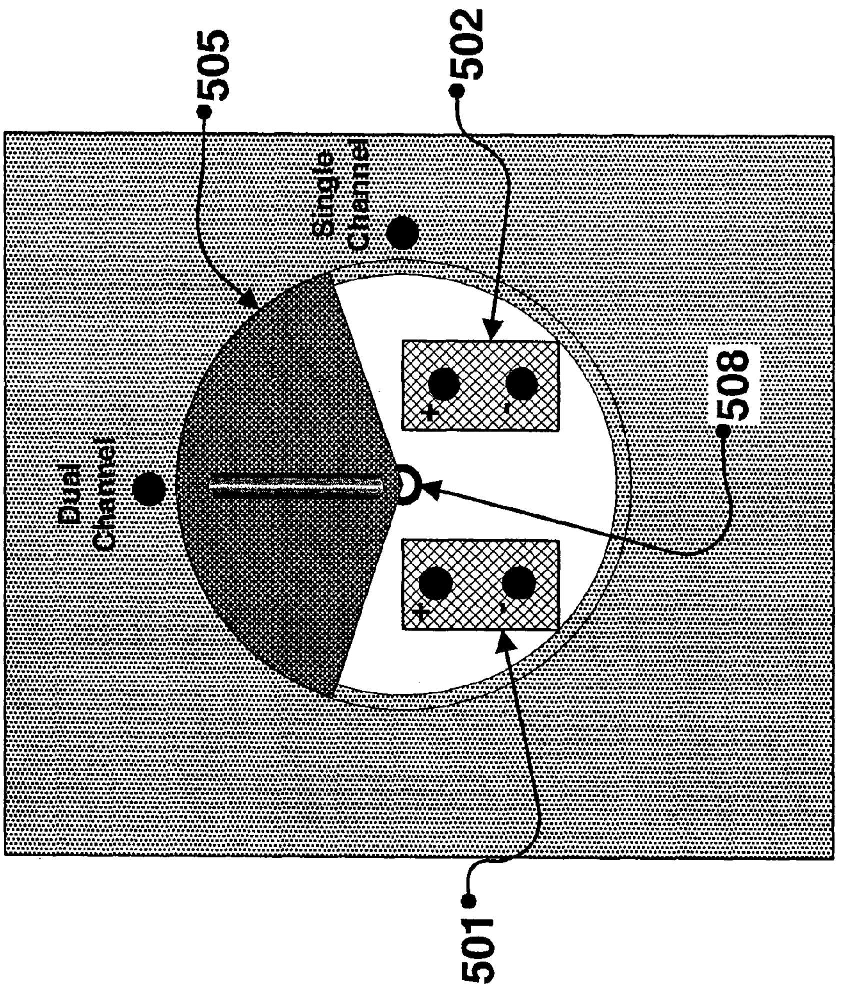

FIG. 5*a* illustrates a front view of the dual purpose loudspeaker according to the third embodiment of the present invention, where the rotary switch is positioned for dual channel input.

Figure 5B:
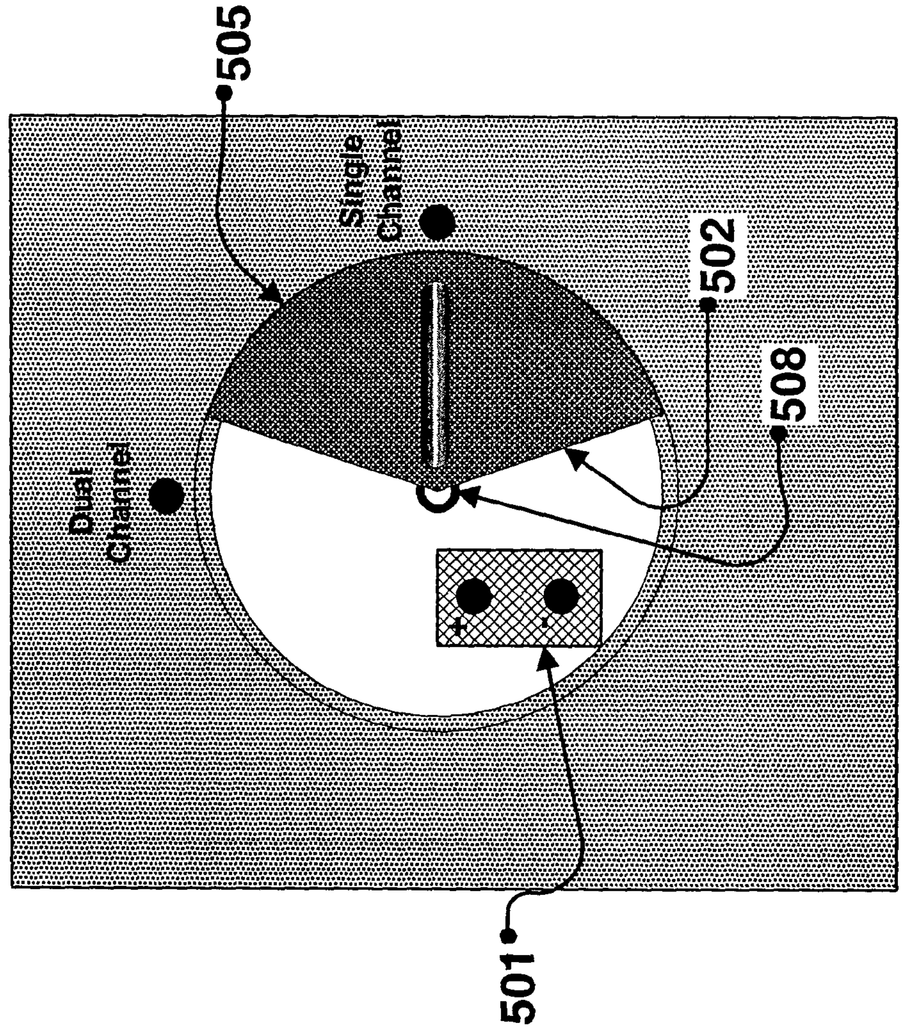

FIG. 5*b* illustrates a front view of the dual purpose loud speaker according to the third embodiment of the present invention, where the rotary switch is positioned for single channel input.

DETAILED DESCRIPTION OF THE INVENTION

Figure 1:
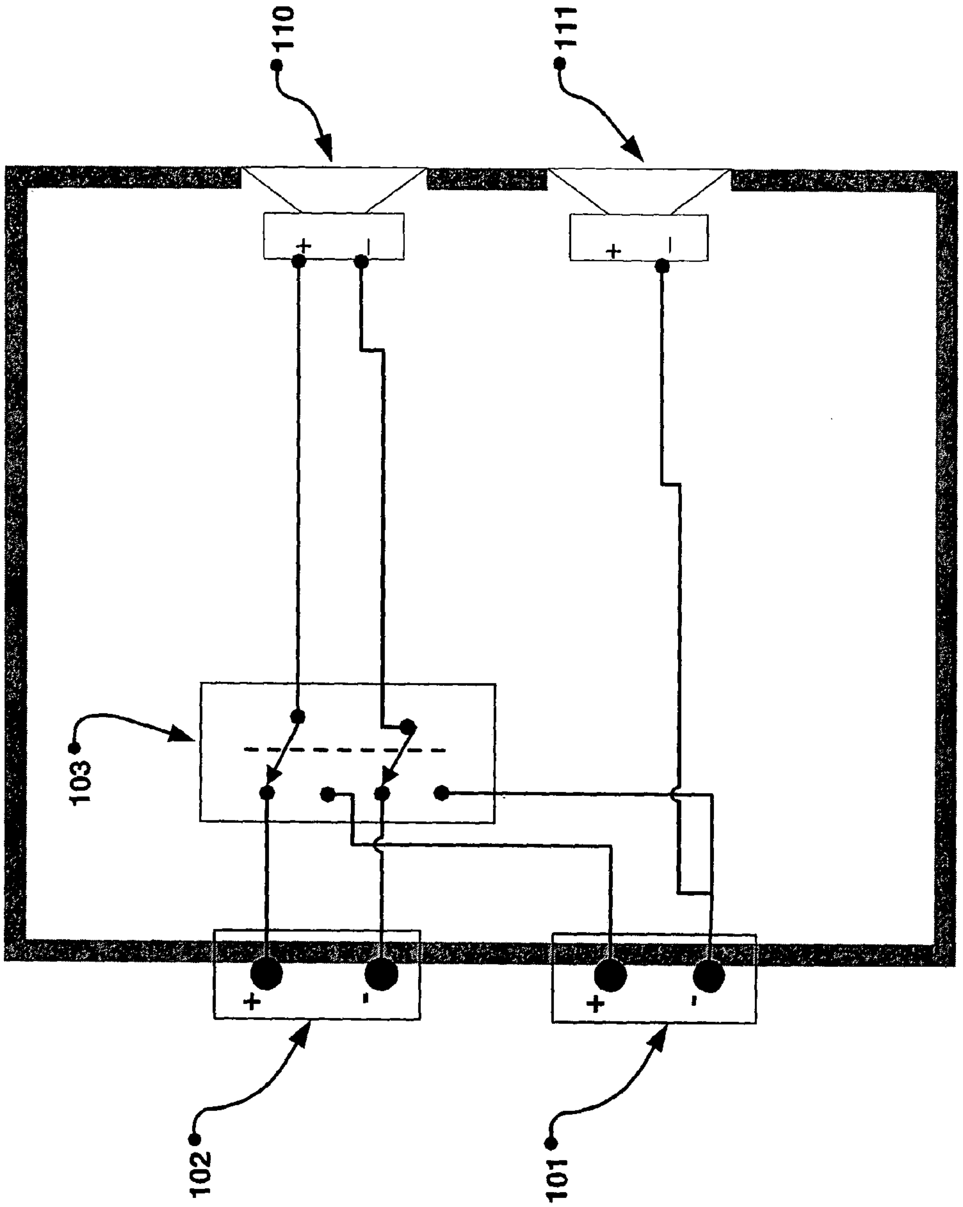
FIG. 1 (Prior Art)
FIG. 1 illustrates schematically a dual purpose loudspeaker using two transducers.

FIG. 1 shows a dual purpose loudspeaker incorporating a first transducer 110 and a second transducer 111 and adapted to receive single or dual channel inputs through a single channel input 101 and a dual channel input 102. A switch 103 has first and second positions. In the first switch position first transducer 110 is connected to single channel input 101 in parallel with second transducer 111 for the purpose of reproducing one audio input signal. In the second switch position, shown in FIG. 1, first transducer 110 is connected to dual channel input 102 and second transducer 111 is connected to single channel input 101 for the purpose of reproducing two audio input signals simultaneously.

Figure 2:
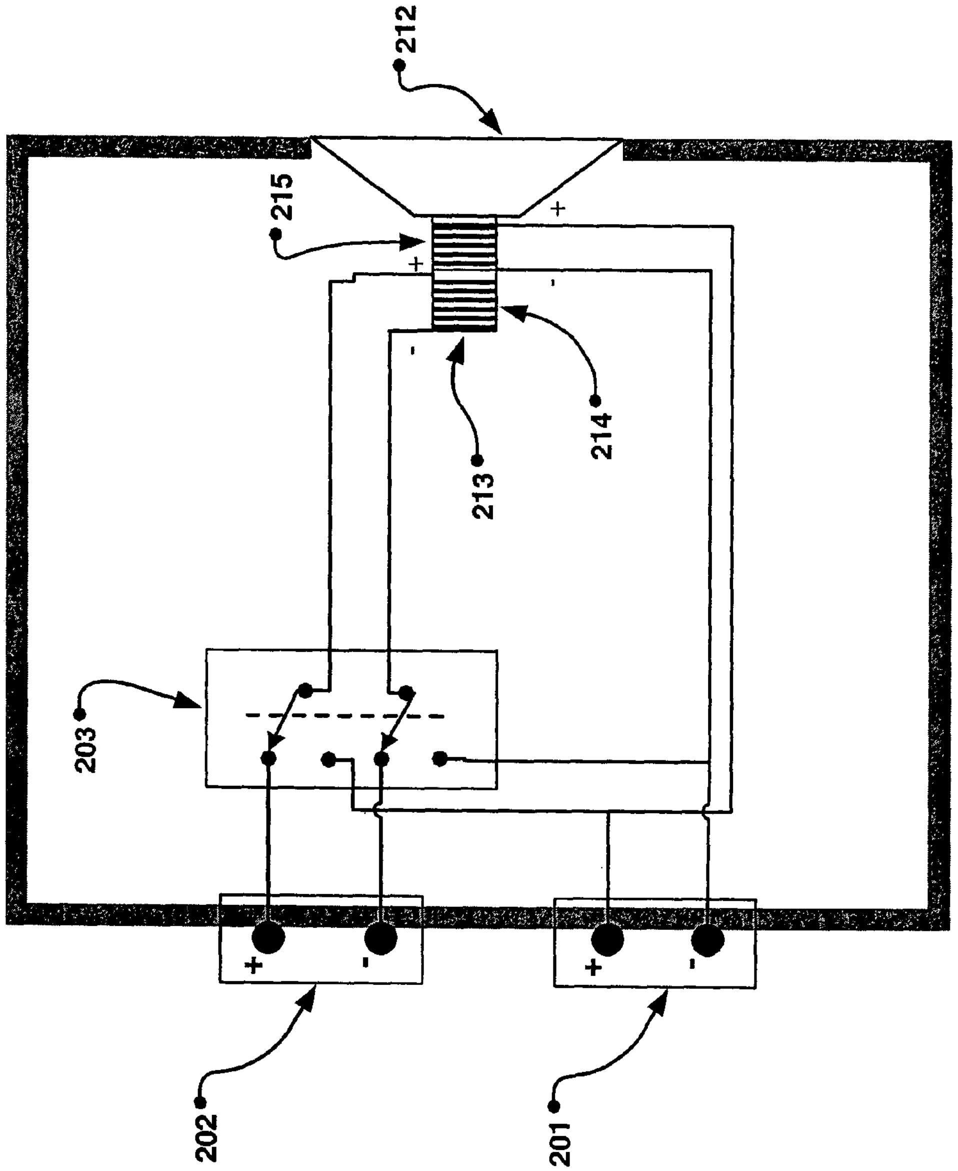
FIG. 2 (Prior Art)
FIG. 2 illustrates schematically a dual purpose loudspeaker using a dual voice-coil transducer.

FIG. 2 shows a dual purpose loudspeaker similar to FIG. 1 but incorporating a single transducer 212 with a dual winding voice-coil 213 having separate first and second windings 214 and 215, respectively, instead of two separate transducers. Similarly to the system of FIG. 1, a switch 203 has first and second positions. In the first switch position, first winding 214 is connected to single channel input 201 in parallel with the second winding 215 for the purpose of reproducing one audio input signal. In the second switch position, as shown in FIG. 2, first winding 214 is connected to a dual channel input 202, and the second winding 215 is connected to a single channel input 201 for the purpose of reproducing two audio input signals simultaneously.

Figure 3:
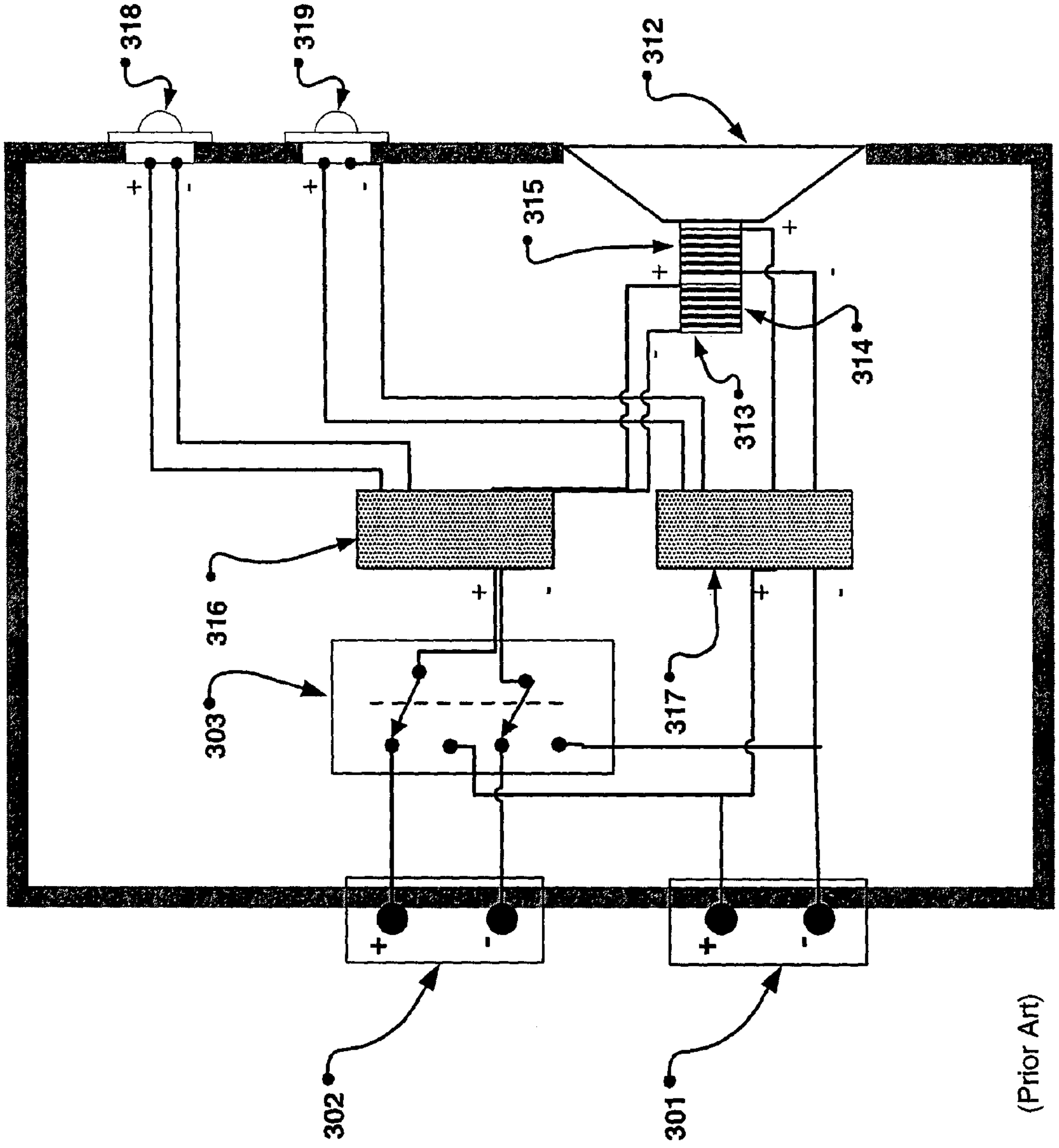
FIG. 3 (Prior Art)
FIG. 3 illustrates schematically a dual purpose loudspeaker using a dual voice-coil transducer and two high frequency transducers.

FIG. 3 shows a dual purpose loudspeaker similar to FIGS. 1 and 2 but incorporating a single transducer 312 with a dual winding voice-coil 313 having separate first and second windings 314 and 315, respectively, first and second high frequency transducers 318 and 319, respectively, and first and second crossover networks 316 and 317, respectively. The high and low frequency outputs of first crossover network 316 are connected to first high frequency transducer 318 and first winding 314, respectively. The high and low frequency outputs of second crossover network 317 are connected to second high frequency transducer 319 and second winding 315, respectively. Similarly to FIGS. 1 and 2, a switch 303 has first and second positions. In the first switch position, as shown in FIG. 3, first crossover network 316 is connected to single channel input 301 in parallel with the second crossover network 317 for the purpose of reproducing one audio input signal. In the second switch position, first crossover network 316 is connected to a dual channel input 302 and the second crossover network 317 is connected to a single channel input 301 for the purpose of reproducing two audio input signals simultaneously.

A first embodiment of the present invention is shown in FIGS. 4, 4*a*, 4*b* and 4*c*. Referring to FIG. 4, a single channel input 401 and a dual channel input 402, are the inputs of a dual purpose loudspeaker such as described above with respect to FIGS. 1, 2 and 3. A switch 403 has first and second positions and performs the function of determining the operating mode of the dual purpose loudspeaker. A switch slide 405 is mechanically coupled to switch 403 by a switch operating lever 404 and an operating lever cover 407 such that as switch slide 405 is moved laterally, switch 403 is moved from one mode-selecting position to the other. Further, when switch 403 is in the single channel position, dual channel input 402 is physically blocked by a portion of switch slide 405 so as to prevent any signal connection to dual channel input 402. Similarly, when switch 403 is in the dual channel position, dual channel input 402 is unobstructed by switch slide 405. As will be recognized by those skilled in the art, the dual purpose function of the loudspeaker according to the present invention may be achieved through any of the methods shown in FIGS. 1, 2 or 3, any combination of these methods, or by any other similar method incorporating a two-position switch for the purpose of determining the operating mode.

Referring again to FIGS. 4, 4*a*, 4*b* and 4*c*, single channel and dual channel inputs 401, 402 are implemented using standard binding posts, a method well-known in the art. Switch slide 405 is positioned such that the binding posts providing connections to dual channel input 402 must be completely screwed down to allow switch slide 405 to move to the single channel position, thereby preventing connection of any wires to dual channel input 402 through either the top or sides of the binding posts. FIGS. 4 and 4*b* show switch slide 405 in the single channel position and blocking dual channel input 402 such that no connections can be made thereto.

As will be apparent to those skilled in the art, binding posts are only one of many different types of input connectors commonly used in loudspeakers. Other types of connections are often used on loudspeakers and may be substituted for the five-way binding posts within the scope of this embodiment of the present invention. Further, it is within the scope of this invention that any such input connectors may be used, as long as a switch slide such as switch slide 405 of FIGS. 4, 4*a*, 4*b* and 4*c*, is configured so as to physically block the connection of wires to said input connectors. FIG. 4*d* shows a second embodiment of the present invention, where spring-clip-type connectors 441, 442 are used instead of five-way binding posts. In all other respects, the second embodiment is identical to the first embodiment, described above.

Referring to FIGS. 5, 5*a* and 5*b*, a third embodiment of the present invention is shown. In this third embodiment, a switch 503 is a rotary-type switch, having at least first and second positions. A switch slide 505 is mechanically coupled to switch 503 by a shaft 508 such that when switch slide 505 is rotated, switch 503 is moved from one mode-selecting position to the other. Further, when switch 503 is in the single-channel position, a dual channel input 502 is physically blocked by switch slide 505 as shown in FIG. 5*b*, so as to prevent any signal connection to dual channel input 502. Only a single channel input 501 is available for connection. Similarly, when switch 503 is in the dual channel position dual channel input 502 is unobstructed, as shown in FIG. 5*a*.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A loudspeaker system comprising:

first and second audio signal input connections;

a switch with first and second switch positions, wherein said first switch position configures said loudspeaker system to reproduce sound only from said first audio signal input connection, and said second switch position configures said loudspeaker system to reproduce sound from both first and second audio signal input connections; and a switch slide mechanically coupled to said switch, wherein said switch slide is positioned so as to physically block said second audio signal input connection so as prevent connection of an input signal to said second audio signal input connection when said switch is in said first switch position, and said switch slide is positioned so as to permit connection of input signals to both first and second audio signal input connections when said switch is in said second switch position.

2. The loudspeaker system according to claim 1, wherein said switch is a toggle-type switch.

3. The loudspeaker system according to claim 1, wherein said switch is a rotary-type switch.

4. The loudspeaker system according to claim 1, wherein said first and second audio signal input connections are five-way-binding-post-type connections.

5. The loudspeaker system according to claim 1, wherein said first and second audio signal input connections are spring-clip-type connections.

* * * * *

UNITED STATES PATENT AND TRADEMARK OFFICE

CERTIFICATE OF CORRECTION

PATENT NO. : 7,043,034 B2
APPLICATION NO. : 10/660733
DATED : May 9, 2006
INVENTOR(S) : Poling et al.

It is certified that error appears in the above-identified patent and that said Letters Patent is hereby corrected as shown below:

<u>Title Page</u>
Item [75], Inventors, please replace "Allen S. Baran" with --Allen S. Baron--.

Signed and Sealed this

Second Day of January, 2007

JON W. DUDAS
*Director of the United States Patent and Trademark Office*